(12) United States Patent
Chen et al.

(10) Patent No.: US 7,958,168 B2
(45) Date of Patent: *Jun. 7, 2011

(54) SYSTEM AND METHOD FOR RESTORING A VIRTUAL DISK FROM A SNAPSHOT

(75) Inventors: Raymond C. Chen, Campbell, CA (US); Kayuri Patel, Cupertino, CA (US); Vijayan Rajan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,992

(22) Filed: Apr. 14, 2010

(65) Prior Publication Data

US 2010/0198795 A1    Aug. 5, 2010

Related U.S. Application Data

(63) Continuation of application No. 11/448,558, filed on Jun. 7, 2006, now Pat. No. 7,743,035, which is a continuation of application No. 10/394,856, filed on Mar. 21, 2003, now Pat. No. 7,076,509, which is a continuation-in-part of application No. 10/216,453, filed on Aug. 9, 2002, now Pat. No. 7,107,385.

(51) Int. Cl.
    *G06F 17/30* (2006.01)
(52) U.S. Cl. ........................... 707/822; 707/818
(58) Field of Classification Search ............... 707/639, 707/674, 831, 999.202, 818, 822, 823
See application file for complete search history.

(56) References Cited

U.S. PATENT DOCUMENTS

| 4,570,217 A | 2/1986 | Allen et al. |
| 4,843,541 A | 6/1989 | Bean et al. |
| 4,916,608 A | 4/1990 | Shultz |
| 5,129,088 A | 7/1992 | Auslander et al. |
| 5,163,131 A | 11/1992 | Row et al. |
| 5,202,979 A | 4/1993 | Hillis et al. |

(Continued)

FOREIGN PATENT DOCUMENTS

WO    WO 02/50433 A1    6/2002

OTHER PUBLICATIONS

David Hitz et al. TR3002 File System Design for a NFS File Server Appliance published by Network Appliance, Inc.

(Continued)

*Primary Examiner* — Cheryl Lewis
(74) *Attorney, Agent, or Firm* — Cesari and McKenna, LLP

(57) ABSTRACT

A method and apparatus are disclosed for restoring a virtual disk (vdisk) in a data storage system as the vdisk was at an earlier time. Pointers are maintained to point to data represented by the vdisk. The pointers are saved to persistent storage at the earlier time. The data at the earlier time is maintained on the data storage device. A pointer pointing to data represented by the vdisk at a later time is compared with the pointers saved at the earlier time. If the pointer from the later time matches the pointer saved at the earlier time, keeping the pointer from the later time in the active file system. If the pointer from the later time does not match the pointers saved at the earlier time, copying a set of pointers associated with the pointer saved at the earlier time to the active file system.

19 Claims, 12 Drawing Sheets

U.S. PATENT DOCUMENTS

| | | | |
|---|---|---|---|
| 5,278,979 | A | 1/1994 | Foster et al. |
| 5,355,453 | A | 10/1994 | Row et al. |
| 5,369,757 | A | 11/1994 | Spiro et al. |
| 5,485,579 | A | 1/1996 | Hitz et al. |
| 5,511,177 | A | 4/1996 | Kagimasa et al. |
| 5,802,366 | A | 9/1998 | Row et al. |
| 5,819,292 | A | 10/1998 | Hitz et al. |
| 5,897,661 | A | 4/1999 | Baranovsky et al. |
| 5,918,229 | A | 6/1999 | Davis et al. |
| 5,931,918 | A | 8/1999 | Row et al. |
| 5,941,972 | A | 8/1999 | Hoese et al. |
| 5,948,110 | A | 9/1999 | Hitz et al. |
| 5,950,225 | A | 9/1999 | Kleiman |
| 5,963,962 | A | 10/1999 | Hitz et al. |
| 5,987,477 | A | 11/1999 | Schmuck et al. |
| 6,038,570 | A | 3/2000 | Hitz et al. |
| 6,065,037 | A | 5/2000 | Hitz et al. |
| 6,105,030 | A | 8/2000 | Syed et al. |
| 6,138,126 | A | 10/2000 | Hitz et al. |
| 6,185,655 | B1 | 2/2001 | Peping |
| 6,205,450 | B1 | 3/2001 | Kanome |
| 6,275,898 | B1 | 8/2001 | DeKoning |
| 6,289,356 | B1 | 9/2001 | Hitz et al. |
| 6,341,341 | B1 | 1/2002 | Grummon et al. |
| 6,425,035 | B2 | 7/2002 | Hoese et al. |
| 6,526,478 | B1 | 2/2003 | Kirby |
| 6,549,992 | B1 | 4/2003 | Armangau et al. |
| 6,606,690 | B2 | 8/2003 | Padovano |
| 6,618,798 | B1 | 9/2003 | Burton et al. |
| 6,643,654 | B1 | 11/2003 | Patel et al. |
| 6,748,504 | B2 | 6/2004 | Sawdon et al. |
| 6,857,001 | B2 | 2/2005 | Hitz et al. |
| 6,959,310 | B2 | 10/2005 | Eshel et al. |
| 7,076,509 | B1 | 7/2006 | Chen et al. |
| 7,107,385 | B2 | 9/2006 | Rajan et al. |
| 7,475,098 | B2 | 1/2009 | Patterson et al. |
| 7,743,035 | B2 * | 6/2010 | Chen et al. ............... 707/674 |
| 2002/0112022 | A1 | 8/2002 | Kazar et al. |
| 2002/0116593 | A1 | 8/2002 | Kazar et al. |
| 2003/0158873 | A1 | 8/2003 | Sawdon et al. |
| 2003/0182301 | A1 | 9/2003 | Patterson et al. |
| 2003/0182313 | A1 | 9/2003 | Federwisch et al. |
| 2004/0030668 | A1 | 2/2004 | Pawlowski et al. |
| 2006/0242179 | A1 | 10/2006 | Chen et al. |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
SCSI-3 Primary Commands, Mar. 28, 1997, T10 995D Revision 11a.
Maintenance Procedures ND (8c) nd-network disk control Feb. 1985.
Misc. Reference Manual Pages ND (4p) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.
David Hitz et al., "File System Design for a NFS File Server Appliance", Technical Report 3002 by Network Appliance, Inc., Jan. 19, 1994, 23 pgs.
Akyurek, Sedat, Placing Replicated Data to Reduce Seek Delays, Department of Computer Science, University of Maryland, UMIACS-TR-91-121, CS-TR-2746, Aug. 1991.
Bitton, Dina, Disk Shadowing, Proceedings of the 14th VLDB Conference, LA, CA 1988.
Chaudhuri, Surajit, et al., Self-Tuning Technology in Microsoft SQL Server, Data Engineering Journal 22, Feb. 1999 pp. 20-27.
Chutani, Sailesh, et al., The Episode File System, in Proceedings of the USENIX Winter 1992.
Coyne, Robert A., et al., Storage Systems for National Information Assets, Proc. Supercomputing 92, Minneapolis, Nov. 1992, pp. 626-633.
Finlayson, Ross S., et al., Log Files: An Extended File Service Exploiting Write-Once Storage Department of Computer Science, Stanford University, Report No. STAN-CS-87-1177, Sep. 1987.
Gray, Jim, et al., The Recovery Manager of the System R Database Manager, ACM Computing Surveys, (13)2:223-242 1981.
Hecht, Matthew S., et al. Shadowed Management of Free Disk Pages with a Linked List, ACM Transactions on Database Systems, 8/4, Dec. 1983, pp. 503-514.
Howard, John, H. et al., Scale and Performance in a Distributed File System, Carnegie Mellon University, CMU-ITC-87-068, Aug. 1987.
Howard, John H., An Overview of the Andrew File System, Carnegie Mellon University, CMU-ITC-88-062 1988.
Howard, John, H. et al., Scale and Performance in a Distributed File System, ACM Trans. Computer System, 6(1), Feb. 1988 pp. 51-81.
Kazar, Michael Leon, Synchronization and Caching Issues in the Andrew File System, Carnegie Mellon University, CMU-ITC-88-063.
Kazar, Michael L., et al., DEcorum File System Architectural Overview, USENIX Summer Conference, Anaheim, California, 1990.
Kemper, Alfons, et al., Performance Tuning for SAP R/3, Data Engineering Journal 22, Feb. 1999 pp. 33-40.
Kent, Jack et al., Optimizing Shadow Recovery Algorithms, IEEE Transactions on Software Engineering, 14( 2): 155-168 , Feb. 1988.
Kistler, et al., Disconnected Operation in the Coda File System, ACM Transactions on Computer Systems, vol. 10, No. 1, Feb. 1992, pp. 3-25.
Lorie, Raymond, A. Physical Integrity in a Large Segmented Database, ACM Trans. Database Syst., vol. 2, Mar. 1977, pp. 91-104.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.
Patterson, D., et al., A Case for Redundant Arrays of Inexpensive Disks (RAID), Technical Report, CSD-87-391, Computer Science Division, Electrical Engineering and Computer Sciences, University of California at Berkeley 1987.
Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.
Peterson, Zachary Nathaniel Joseph, Data Placement for Copy-on-Write Using Virtual Contiguity, University of CA, Santa Cruz, Master's Thesis for the Department of Science in Computer Science, Sep. 2002.
Quinlan, Sean, A Cached WORM File System, Software-Practice and Experience, 21(12):1289-1299 1991.
Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.
Rosenblum, Mendel, et al. The Design and Implementation of a Log-Structured File System Jul. 24, 1991 pp. 1-15.
Rosenblum, Mendel, The Design and Implementation of a Log-Structured File System, 1992 pp. 1-93.
Rosenblum, Mendel, et al., The Design and Implementation of a Log-Structured File System, in Proceedings of ACM Transactions on Computer Systems, (10)1:26-52, Feb. 1992.
Schiefer, Berni, et al., DB2 Universal Database Performance Tuning, Data Engineering Journal 22, Feb. 1999 pp. 12-19.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shasha, Dennis, Tuning Time Series Queries in Finance: Case Studies and Recommendations, Data Engineering Journal 22, Feb. 1999 pp. 41-47.
Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.
Weikum, Gerhard, et al., Towards Self-Tuning Memory Management for Data Servers, Data Engineering Journal 22, Feb. 1999 pp. 3-11.
West, Michael, et al. The ITC Distributed File System: Prototype and Experience, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Tanenbaum, "Structured Computer Organization", published by Prentice Hall, Inc., 1984, p. 10-12.
Kim et al., "Volume Management in SAN Environment", Copyright 2001 IEEE, pp. 500-505.
"Network Appliance Ends NAS/SAN War", by Computerwire, http://www.theregister.co.uk/content/63/27368.html; posted on Feb. 10, 2002.
Callagnan, B., "NFS Version 3 Protocol Specification", Request for Comments (RFC) 1813, Jun. 1995.
International Search Report PCT/US03-23597, Mar. 9, 2004, 7 pages, International Searching Authority, Alexandria, Virginia, USA.
International Search Report PCT/US03-23597, Apr. 14, 2003, 7 pages, International Searching Authority, Alexandria, Virginia, USA.
Lu, Y. "Performance Study of ISCSI-Based Storage Subsystems", IEEE Communications Magazine, pp. 76-82, Aug. 2003.
"Notification of Transmittal of the International Search Report or the Declaration", International Application No. PCT/US03/23661, Mailed Mar. 9, 2004, 6 pages.
"Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Oct. 29, 2007 in United States District Court for the Northern District of California, San Jose Division, Civil Action No. 5:07-cv-05448-JW, 15 pages.
"First Amended Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Nov. 2, 2007 in United States District Court for the Northern District of California, San Jose Division, Civil Action No. 5:07-cv-05448-JW, 15 pages.
"Answer and Counterclaims to First Amended Complaint for: (1) Patent Infringement, (2) Unfair Competition Under the Lanham Act, (3) Unfair Competition Under Cal. Bus. & Prof. Code § 17200", filed Dec. 21, 2007 in United States District Court for the Northern District of California, San Francisco Division. Case No. 5:07-cv-05448-JW, 29 pages.
Sun Microsystems Inc.'s Reply to Network Appliance, Inc.'s Answer and Counterclaims to First Amended Complaint, filed Jan. 14, 2008 in United States District Court for the Northern District of California, San Francisco Division. Case No. 5:07-cv-05448-JW, 14 pages.
"Supplemental Answer and Counterclaims to First Amended Complaint for: (1) Patent Infringement, (2) Unfair Competition Under the Lanham Act, (3) Unfair Competition Under Cal. Bus. & Prof. Code § 17200", filed Feb. 19, 2008 in United States District Court for the Northern District of California, San Francisco Division. Case No. 5:07-cv-05448-JW, 28 pages.
"Sun Microsystems Inc.'s Reply to Network Appliance, Inc.'s Supplemental Answer and Counterclaims to First Amended Complaint and Counterclaims for Declaratory Relief", filed Mar. 7, 2008 in United States District Court for the Northern District of California, San Francisco Division. Case No. 5:07-cv-05448-JW, 19 pages.
Sun Microsystems, Inc.'s Preliminary Invalidity Contentions and Accompanying Document Production for U.S. Patent No. 7,107,385, filed May 30, 2008 in United States District Court for the Northern District of California, San Francisco Division. Case No. 5:07-cv-05448-JW, 44 pages.
Anderson, Curtis, "xFS Attribute Manager Design", Silicon Graphics, Oct. 17, 1993, 15 pages.
Anderson, Curtis, "xFS NameSpace Manager Design", Silicon Graphics, Oct. 7, 1993, 12 pages.
Anderson et al., "xFS Project Architecture", Silicon Graphics, Oct. 8, 1993, 15 pages.

Doucette, Doug, "Space Manager Overview", Silicon Graphics, Dec. 16, 1993, 18 pages.
Doucette, Doug, "xFS Kernel Threads Support", Silicon Graphics, Oct. 7, 1993, 3 pages.
Doucette, Doug, "xFS Message System Design", Silicon Graphics, Oct. 7, 1993, 5 pages.
Doucette, Doug, "xFS Simulation Environment", Silicon Graphics, Oct. 7, 1993, 4 pages.
Doucette, Doug, "xFS Space Manager Design", Silicon Graphics, Oct. 7, 1993, 12 pages.
Ellis et al. "Getting Started With XFS Filesystems", Silicon Graphics Copyright 1994, 129 pages.
Hu, Wei, "UUIDs", Silicon Graphics, Oct. 7, 1993, 5 pages.
Klieman, S.R., "Vnodes: An Architecture for Multiple File System Types in Sun UNIX", Proceedings of the USENIX Conference, Summary, 1986, 1 page.
Lee et al., "Petal: Distributed Virtual Disks", published in the Proceedings of the 7th International Conference on Architectural Support for Programming Languages and Operating Systems, Copyright 1996, 9 pages.
Leffler et al. "The Design and Implementation of the 4.3 BSD UNIX Operating System", ISBN 0-201-06196-1, Reprinted Oct. 1990, entire book.
McVoy et al., "Extent-like Performance from a UNIX File System", USENIX Conference, Winter 1991, 12 pages.
Nishimoto, Michael, "The Log Manager (xLM)", Silicon Graphics, Mar. 28, 1994, 10 pages.
Nishimoto, Michael, "Log Manager Design", Silicon Graphics, Dec. 17, 1993, 11 pages.
Sweeney, Adam, "64 Bit File Access", Silicon Graphics, Oct. 7, 1993, 9 pages.
Sweeney et al., "Scalability in the XFS File System", Silicon Graphics, retrieved from <http://oss.sgi.com/projects/xfs/papers/xfs_usenix/index.html> on Mar. 6, 2008, 19 pages.
Sweeney, Adam, "xFS Block Zeroing Mechanism", Silicon Graphics, Aug. 2, 1994, 6 pages.
Sweeney, Adam, "xFS In-core Inode Management", Silicon Graphics, Nov. 29, 1993, 1 page.
Sweeney, Adam, "xFS Superblock Management", Silicon Graphics, Dec. 10, 1993, 4 pages.
Sweeney, Adam, "xFS Transaction Mechanism", Silicon Graphics, Oct. 7, 1993, 18 pages.
Thekkath et al., "Frangipani: A Scalable Distributed File System", retrieved from <http://www.thekkath.org/papers/frangipani.pdf> on Sep. 17, 2008, 14 pages.
"XFS Detailed Design—Directory Structures", retrieved from <http://oss.sgi.comlprojects/xfs/design_docs/xfsdocs93.pdf>, Apr. 13, 1992, 12 pages.
"XFS Design Documents README File", retrieved from <http://oss.sgi.comlprojects/xfs/design_docs/xfsdocs93.pdf>, Mar. 6, 2008, 2 pages.
"Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 34 pages.
"Declaration of Dr. Scott Brandt in Support of Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 7 pages.
"Declaration of Dr. John Hartman in Support of Sun Microsystems, Inc.'s Opening Claim Construction Brief (with Exhibits 1-4)", filed Sep. 15, 2008 in United States District Court for the Northern District of California, San Jose Division, Civil Action No. 5:07-cv-05448-JW, 34 pages.
"Sun Microsystems, Inc.'s Responsive Claim Construction Brief Concerning the Sun Patent Claim Terms", filed Sep. 29, 2008 in United States District Court for the Northern District of California, San Francisco Division, Case No. 3:07-cv-05488-EDL, 35 pages.
"Declaration of Dr. Martin E. Kaliski in Support of Sun Microsystems, Inc.'s Responsive Claim Construction Brief" (with Exhibits A-D), filed Sep. 29, 2008 in United States District Court for the Northern District of California, San Francisco Division, Case No. 3:07-cv-05488-EDL, 34 pages.

"Declaration of Dr. A.L. Narashima Reddy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 18 pages.

"Declaration of Dr. John Levy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 20 pages.

"NetApp Inc.'s Reply to Sun Microsystems, Inc.'s Responsive Claim Construction Brief", filed Oct. 10, 2008 in United States District Court for the Northern District of California, San Francisco Division, Case No. 3:07-cv-05488-EDL, 19 pages.

"Sun Microsystems, Inc.'s Reply Claim Construction Brief Concerning the NetApp Patent Claim Terms", filed Oct. 10, 2008 in United States District Court for the Northern District of California, San Francisco Division, Case No. 3:07-cv-05488-EDL, 24 pages.

"Declaration of Dr. John H. Hartman in Support of Sun Microsystems, Inc.'s Reply Claim Construction Brief", filed Oct. 10, 2008 in United States District Court for the Northern District of California, San Francisco Division, Case No. 3:07-cv-05488-EDL, 3 pages.

"Declaration of Dr. Scott Brandt in Support of Sun Microsystems, Inc.'s Reply Claim Construction Brief Concerning the NetApp Patent Claim Terms (with Exhibit 1)", filed Oct. 10, 2008 in United States District Court for the Northern District of California, San Francisco Division, Case No. 3:07-cv-05488-EDL, 34 pages.

"Order Construing Claim Terms of the '720 and '417 Patents", filed Dec. 23, 2008 in United States District Court for the Northern District of California, San Francisco Division, Case No. 3:07-cv-05488-EDL, 38 pages.

"Order Regarding Tentative Claim Construction", filed Jan. 14, 2009 in United States District Court for the Northern District of California, San Francisco Division, Case No. 3:07-cv-05488-EDL, 2 pages.

"Expert Report of Mark E. Nusbaum", dated Oct. 12, 2009 in United States District Court for the Northern District of California, San Francisco Division, Case No. 3:07-cv-05488-EDL, 97 pages.

"Opening Expert Report of Scott Brandt, PH.D., Regarding the Invalidity and Unenforceability of U.S. Patent Nos. 6,868,417 and 7,107,385", dated Oct. 12, 2009 in United States District Court for the Northern District of California, San Francisco Division, Case No. 3:07-cv-05488-EDL, 180 pages.

"Rebuttal Expert Report of Gregory R. Ganger Regarding Validity of U.S. Patent Nos. 6,868,417 and 7,107,385", dated Nov. 4, 2009 in United States District Court for the Northern District of California, San Francisco Division, Case No. 3:07-cv-05488-EDL, 253 pages.

"Rebuttal Expert Report of Cameron K. Weiffenbach", dated Nov. 4, 2009 in United States District Court for the Northern District of California, San Francisco Division, Case No. 3:07-cv-05488-EDL, 21 pages.

"Sun Microsystems, Inc.'s Notice of Motion and Motion for Summary Judgment of Invalidity of NetApp's U.S. Patent No. 7,107,385", filed on Dec. 2, 2009 in United States District, Northern District of California, San Francisco Division, Case No. C-07-05488 EDL, 29 pages.

"Stipulated Dismissal Without Prejudice and Order", filed Sep. 8, 2010 in United States District Court for the Northern District of California, San Francisco Division, Case No. 3:07-cv-05488-EDL, 2 pages.

* cited by examiner

| | |
|---|---|
| VDISK ID | 905 |
| GENERATION | 910 |
| TWIN ID | 915 |
| TWIN GENERATION | 920 |
| SNAPSHOT ID | 925 |
| SNAPSHOT GENERATION | 930 |
| SNAP ID | 935 |
| LAST FBN | 940 |

FIG. 9

SYSTEM AND METHOD FOR RESTORING A VIRTUAL DISK FROM A SNAPSHOT

RELATED APPLICATIONS

This application is a continuation of U.S. patent application Ser. No. 11/448,558, filed on Jun. 7, 2006, entitled SYSTEM AND METHOD FOR RESTORING A VIRTUAL DISK FROM A SNAPSHOT, now issued as U.S. Pat. No. 7,743,035 on Jun. 22, 2010, which is a continuation of U.S. patent application Ser. No. 10/394,856, filed on Mar. 21, 2003, entitled SYSTEM AND METHOD FOR RESTORING A VIRTUAL DISK FROM A SNAPSHOT, now issued as U.S. Pat. No. 7,076,509 on Jul. 11, 2006, which is a continuation-in-part of U.S. patent application Ser. No. 10/216,453, filed on Aug. 9, 2002, entitled SYSTEM AND METHOD FOR OVERLAYING A VIRTUAL DISK ON A FILE SYSTEM, now issued as U.S. Pat. No. 7,107,385 on Sep. 12, 2006, by Vijayan Rajan et al., the contents of which are hereby incorporated by reference.

FIELD OF THE INVENTION

The present invention relates to data backup and restoral and, more particularly restoring a virtual disk from a snapshot.

BACKGROUND OF THE INVENTION

A storage system is a computer that provides storage service relating to the organization of information on writable persistent storage devices, such as memories, tapes or disks. The storage system may be deployed within a storage area network (SAN) or a network attached storage (NAS) environment. When used within a NAS environment, the storage system may be embodied as a file server including a storage operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. A SAN arrangement or deployment allows decoupling of storage from the storage system, such as an application server, and placing of that storage on a network. However, the SAN storage system typically manages specifically assigned storage resources. Although storage can be grouped (or pooled) into zones (e.g., through conventional logical unit number or "lun" zoning, masking and management techniques), the storage devices are still pre-assigned by a user, e.g., a system administrator, to the storage system. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet.

Storage virtualization generally involves the pooling of storage resources from multiple storage devices, such as physical disks, typically across a network by one or more storage systems to create a "user-defined volume". The term "volume" as conventionally used in a SAN environment implies a storage entity that is constructed (by a system administrator) by specifying physical disks and extents within those disks via operations that combine those extents/disks into a user-defined volume storage entity. An extent is a set of contiguously addressed blocks (or "slices") of storage within the specified physical disks. Such construction can occur on either the storage device or application server. Storage virtualization is often used as part of a SAN deployment, wherein the user-defined volume appears as a single storage entity to the operating system, regardless of the types of storage devices pooled. Virtualization thus separates the representation of storage to the operating system from the actual physical storage connected over the network.

Storage virtualization has many interpretations, including decoupling of physical disk size limitations and underlying physical structure from a user-defined volume corresponding to a disk or lun. Virtualization may also refer to management of luns, including defining underlying reliability guarantees of the storage. Commonly, this aspect of virtualization is accomplished through explicit mirroring or Redundant Array of Independent (or Inexpensive) Disks (RAID) protection levels to a lun that is formed from the storage pool. That is, the system administrator explicitly defines the underlying reliability guarantees of the constructed user-defined volume. It can be appreciated that this administrative procedure is complex, time consuming and, therefore, costly.

Virtualization may further denote the ability to modify an existing configuration of a lun (e.g., to increase its size) along with the performance characteristics of the lun. However, conventional physical disks and strategies that explicitly construct larger units of storage for use by clients may suffer performance limitations. For example, bandwidth to a user-defined volume constructed through explicit aggregation of a number of disks and/or "slices" (extents) of those disks may be limited by physical constraints of the underlying properties of the constructed volume.

In some virtualization systems, a SAN or block-based data storage model is overlaid onto file-based file system, thereby enabling clients who require the use of block-based addressing to utilize the services of a file server having an appropriate virtualization system. In an exemplary file system, each unit of information associated with a file, including, for example, its name, its owner, time stamps, etc is implemented as a file attribute. Both files and directories have attributes, wherein each attribute may consist of a single data stream. Such an implementation facilitates the addition of new attributes to a file, including data content attributes. Therefore, files and directories may contain multiple data streams, however, each on-disk file must contain at least a default data stream through which the file data is accessed.

In the exemplary WAFL file system, individual files are described by inodes, including, for example, directory inodes, regular inodes and stream inodes. A stream inode represents a named data stream so that multiple data streams may be stored on disks associated with a storage appliance as representations embodying the stream inode type associated with a file. Each stream inode has its own size, file share locks, byte range locks and data blocks; however other file attributes, such as time stamps, group and user ownership information, and access control lists are common for all named data streams and are stored in an on-disk "base inode". The default data stream, along with its size, data blocks, file share locks and byte range locks, is also stored in the base inode. Additionally, the names and file handles of the data streams are stored in a "hidden" directory within the file system that is referenced by the base inode. The hidden directory is represented as a stream_dir inode type. The hidden directory is "invisible" in a directory hierarchy that is viewed by a user (e.g., a client) external to the file system and, thus, is inaccessible through an external file system protocol, such as the Common Internet File System protocol.

In the example of the Write Anywhere File Layout (WAFL) file system, by Network Appliance, Inc., of Sunnyvale, Calif., a file is represented as an inode data structure adapted for storage on disks. Broadly stated, the on-disk format representation of the exemplary WAFL file system is block based using, e.g., 4 kilobyte (KB) blocks and using inodes to describe the files. An inode is a data structure used to store information, such as metadata, about the file. That is, the information contained in an inode may include, e.g., ownership of the file, access permission for the file, size of the file, or other attributes, described further below. The WAFL file system uses a file handle, i.e., an identifier that includes an inode number, to retrieve an inode from disk. The exemplary WAFL file system also uses files to store metadata describing the layout of its file system. These metadata files include, among others, an inode file. The on-disk format structure of the WAFL file system, including inodes and the inode file, is disclosed and described in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998 and incorporated by reference as though fully set forth herein.

FIG. 1 is a schematic block diagram illustrating an exemplary on-disk inode 100, which preferably includes a metadata section 110 and a data section 150. The information stored in the metadata section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The metadata section 110 further includes a xinode field 130 containing a pointer 140 that references another on-disk inode structure containing, e.g., access control list (ACL) information associated with the file or directory. The contents of the data section 150 of each inode may be interpreted differently depending upon the type of file (inode) defined within the type field 112. For example, the data section 150 of a directory inode contains metadata controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data block on disk used to store the user data. Each pointer is preferably a logical volume block number which is thereby facilitate efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less is than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 kilobyte data block on disk.

Some known storage operating systems contain the capability to generate a snapshot of the file system. In the example of a WAFL-based file system, snapshots are described in *TR3002 File System Design for a NFS File Server Appliance* by David Hitz et al., published by Network Appliance, Inc. which is hereby incorporated by reference and in above-incorporated U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

A snapshot is a restorable version of a file system created at a predetermined point in time. Snapshots are generally created on some regular schedule. The snapshot is stored on-disk along with the active file system, and is called into a buffer cache of the filer memory as requested by the storage operating system. An exemplary file system inode structure 200 is shown in FIG. 2. The inode for an inode file 205 contains information describing the inode file associated with a given file system. In this exemplary file system inode structure the inode for the inode file 205 contains a pointer to an inode file is indirect block 210. The inode file indirect block 210 contains a set of pointers to inodes 217, which in turn contain pointers to indirect blocks 219. The indirect blocks 219 include pointers to file data blocks 220A, 220B and 220C. Each of the file data blocks 220(A-C) is capable of storing, in the illustrative embodiment, 4 kilobytes (KB) of data.

When the storage operating system generates a snapshot of a given file system, a snapshot inode is generated as shown in FIG. 3. The snapshot inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the snapshot inode 305 contains a point to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until is they are released from all snapshots. Thus, while the active file system inode for the inode file 405 points to new blocks 220A, 220B and 220C', the old blocks 210, 217, 219 and 220C are retained until the snapshot is fully released.

After a snapshot has been created and file data blocks modified, the storage operating system can reconstruct or "restore" the file system inode structure as it existed at the time of the snapshot by accessing the snapshot inode. By following the pointers contained in the snapshot inode 305 through the inode file indirect block 210, inode 217 and indirect block 219 to the unmodified file data blocks 220A-C, the storage operating system can reconstruct the file system as it existed at the time of creation of the snapshot.

In known restoration techniques from snapshots, the snapshotted files are copied from the snapshot to the active file system. These copies are generated by duplicating inodes and data blocks stored in the snapshot and writing these duplicated blocks and inodes to the active file system. Thus, the snapshot is effectively duplicated into the active file system. A noted disadvantage of such a restore technique is that each inode or data block of the snapshot needs to be copied. Such copying, in the case of a large file system, can require a substantial amount of time and processing power. For example, files may be sized on the order of tens of gigabytes. Similarly, using known file restore techniques from a snapshot, the volume containing the snapshotted file must be large enough to accommodate two full copies of the file, namely, the snapshot and the file in the active file system. In the example of the large file, a volume may not be of sufficient size to accommodate two full copies of the file.

One technique to avoid resource-consuming duplication the entire file system is to use the storage operating system's capabilities to restore on demand. Restore on demand techniques are described generally in U.S. Pat. No. 7,475,098, issued on Jan. 6, 2009, entitled SYSTEM AND METHOD FOR MANAGING A PLURALITY OF SNAPSHOTS by Hugo Patterson et al. A noted disadvantage of such restore on demand technique is an entire directory tree associated with the file must also be restored. For example, if the desired file to be restored is two directories down, for example, in /foo/bar/file, then the directory /foo and the subdirectory /bar must also be restored. This is reduces the efficiency of the file restoration process. Additionally, such restore on demand techniques typically cannot support the restoration of files that include streams or other metadata that are not stored internal to the file but are, stored in a separate data stream associated with the file. Such restore on demand techniques typically utilize the snapshot copying methodology, described above, to restore a particular file. Thus, the noted disadvantages of the snapshot duplication method, e.g., processing overhead and use of file system space, are inherent in these restore on demand techniques.

However, there are instances when the restoration of only a single file from a snapshot is desired. For example, the entire file system may not suffer an error condition, but a single file may become corrupted. Additionally, a user may have modified files but later desires to restore the files to a previous state. In these instances, the restoration of the entire file system is clearly an inefficient approach.

SUMMARY OF THE INVENTION

The disadvantages of the prior art are overcome by providing a system and method for quickly restoring a virtual disk (vdisk) from a snapshot to an active file system of a storage system. A vdisk is an encapsulated data container that stores both data and metadata. In the illustrative embodiment, the metadata associated with the vdisk may be stored in data streams associated with a file implementing the vdisk. Thus, in the illustrative embodiment, a vdisk is represented by a base inode and one or more stream inodes. The base inode is associated with storing the data contained within the vdisk, while the stream inodes associated with the various metadata associated with the vdisk. Initially, a determination is made if the vdisk is in the active file system.

If the vdisk has been deleted from the active file system, then a vdisk inode is created and its associated buffer tree is generated which points to the data blocks of the vdisk to be restored. This newly created inode and associated buffer tree is then written to the active file system. The associated stream inode is then copied from the snapshot to is the active file system, thereby restoring the vdisk. By avoiding duplication of the data blocks, substantial storage space, processing overhead and time is saved.

If the vdisk exists in the active file system, then the snapshot restoration process duplicates the vdisk's inode into a twin inode and moves the buffer tree of the vdisk to the twin inode. A new inode for the restored vdisk is then generated. A reconciliation process then compares block pointers from the duplicated twin inode and the snapshot inodes. If the block pointers match, then the block pointer is moved from the twin inode into the inode of the restored vdisk in the active file system. If the block pointers and the block not already in the active file system differ, then the block pointer from the snapshot is copied to the active file system. Otherwise, the actual data block is copied from the snapshot to the active file system. At the end of the reconciliation process, the twin inode only contains block pointers to blocks that have changed with respect to the snapshot. After completion of the reconciliation process the associated streams of the vdisk are copied from the snapshot to the active file system. The vdisk is then restored to the active file system.

By not duplicating the numerous data blocks stored in the snapshot, substantial processing time/overhead and storage space is saved. In an alternative embodiment, a determination can be made by the size of the vdisk to be restored. If the vdisk is of a certain size or smaller, the restoration process utilizes a conventional snapshot duplication technique.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 9 is a schematic block diagram of an exemplary tracking entry in accordance with an embodiment of the present invention;

DETAILED DESCRIPTION OF AN ILLUSTRATIVE EMBODIMENT

A. Storage Appliance

When used in a SAN environment, a storage system may be embodied as a multi-protocol storage appliance having a storage operating system that implements a file system and provides for storage virtualization and support for virtual disks (vdisks). An example of a multi-protocol storage appliance that may be advantageously used with the present invention is described in co-pending and commonly assigned U.S. Pat. No. 7,873,700, issued on Jan. 18, 2011, entitled A MULTI-PROTOCOL STORAGE APPLIANCE THAT PROVIDES INTEGRATED SUPPORT FOR FILE AND BLOCK ACCESS PROTOCOLS, by Brian Pawlowski, et al., which was published on Feb. 12, 2004 as U.S. Patent Publication No. 2004/0030668 A1, which application is hereby incorporated by reference as though fully set forth herein.

Figure 1:
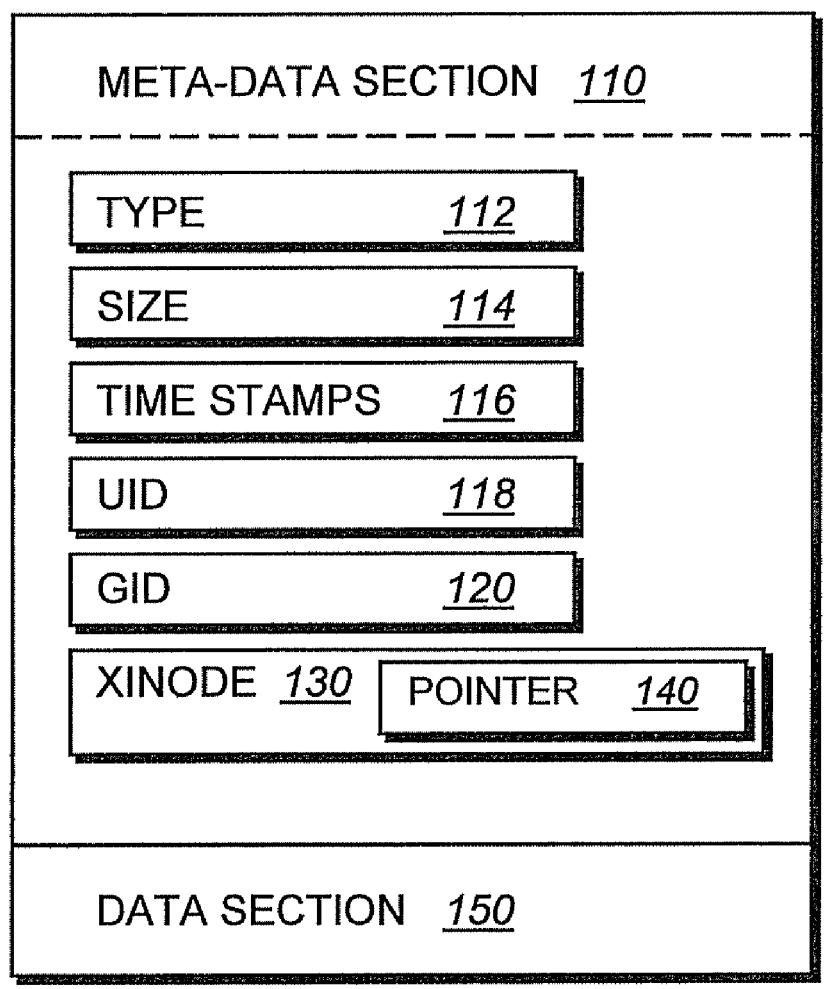
FIG. 1, already described, is a schematic block diagram of an exemplary on-disk inode in accordance with an exemplary file system.
Figure 2:
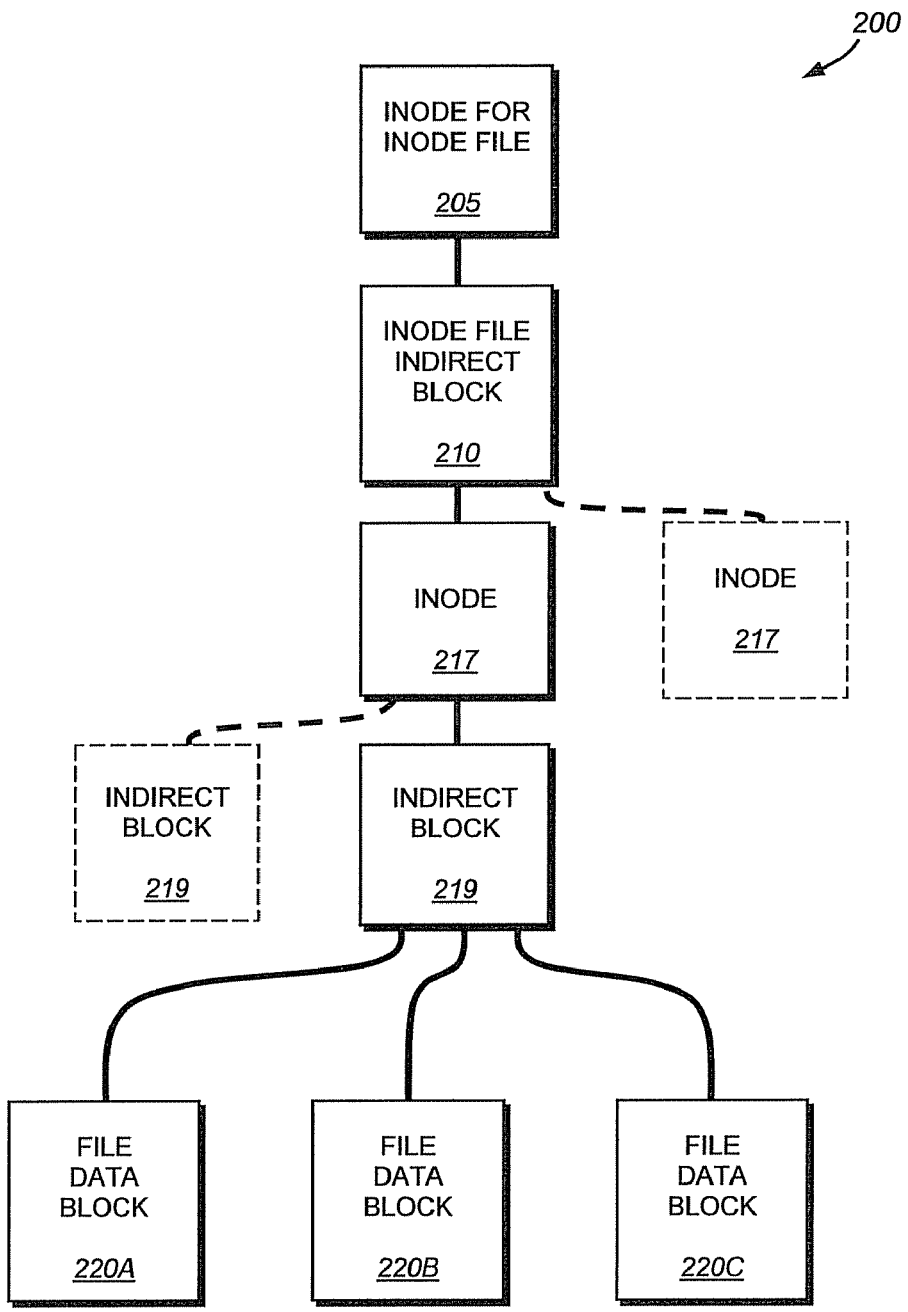
FIG. 2, already described, is a schematic block diagram of an exemplary on-disk file.
Figure 3:
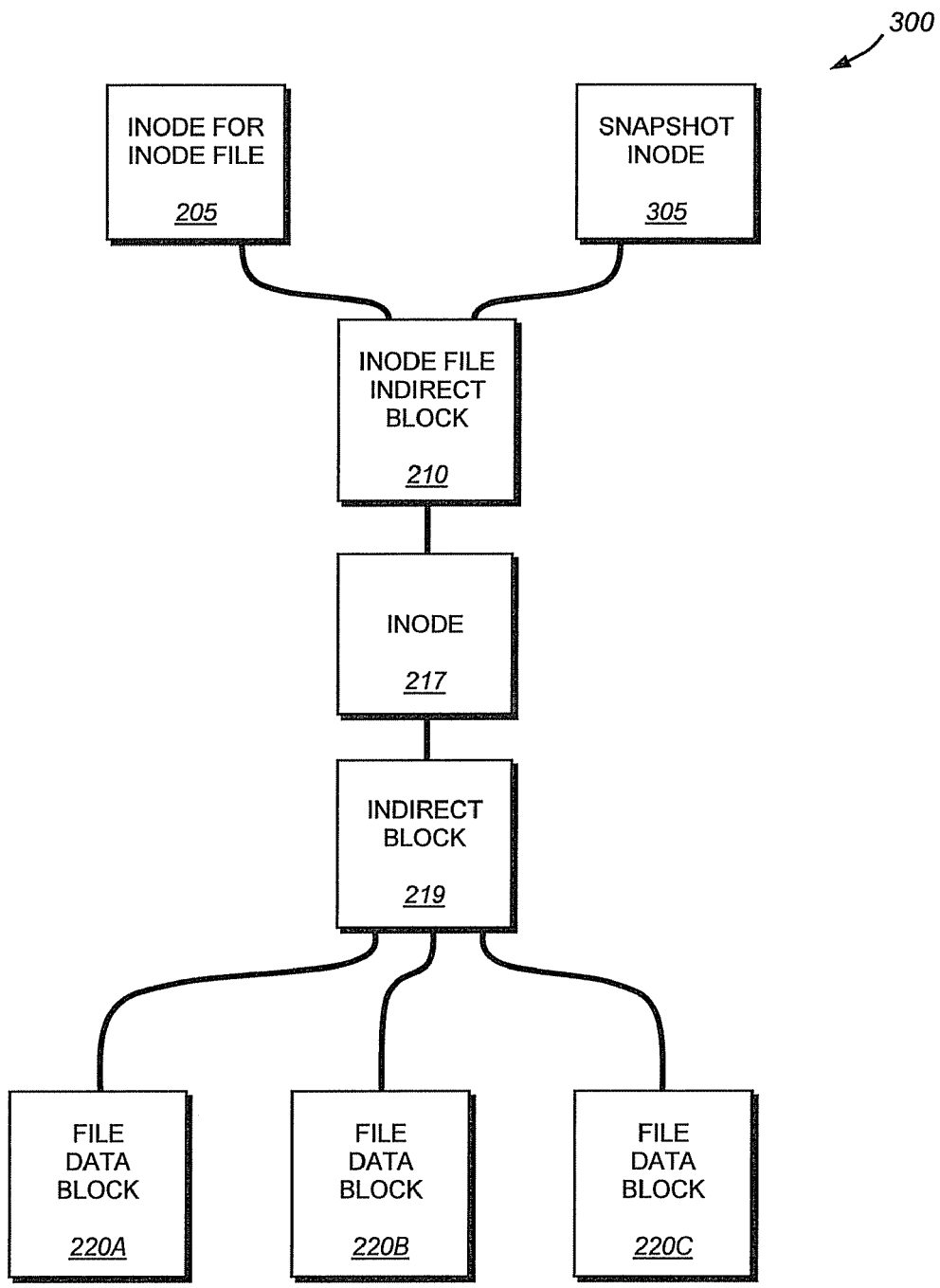
FIG. 3, already described, is an exemplary on-disk representation of a file showing is an associated snapshot inode.
Figure 4:
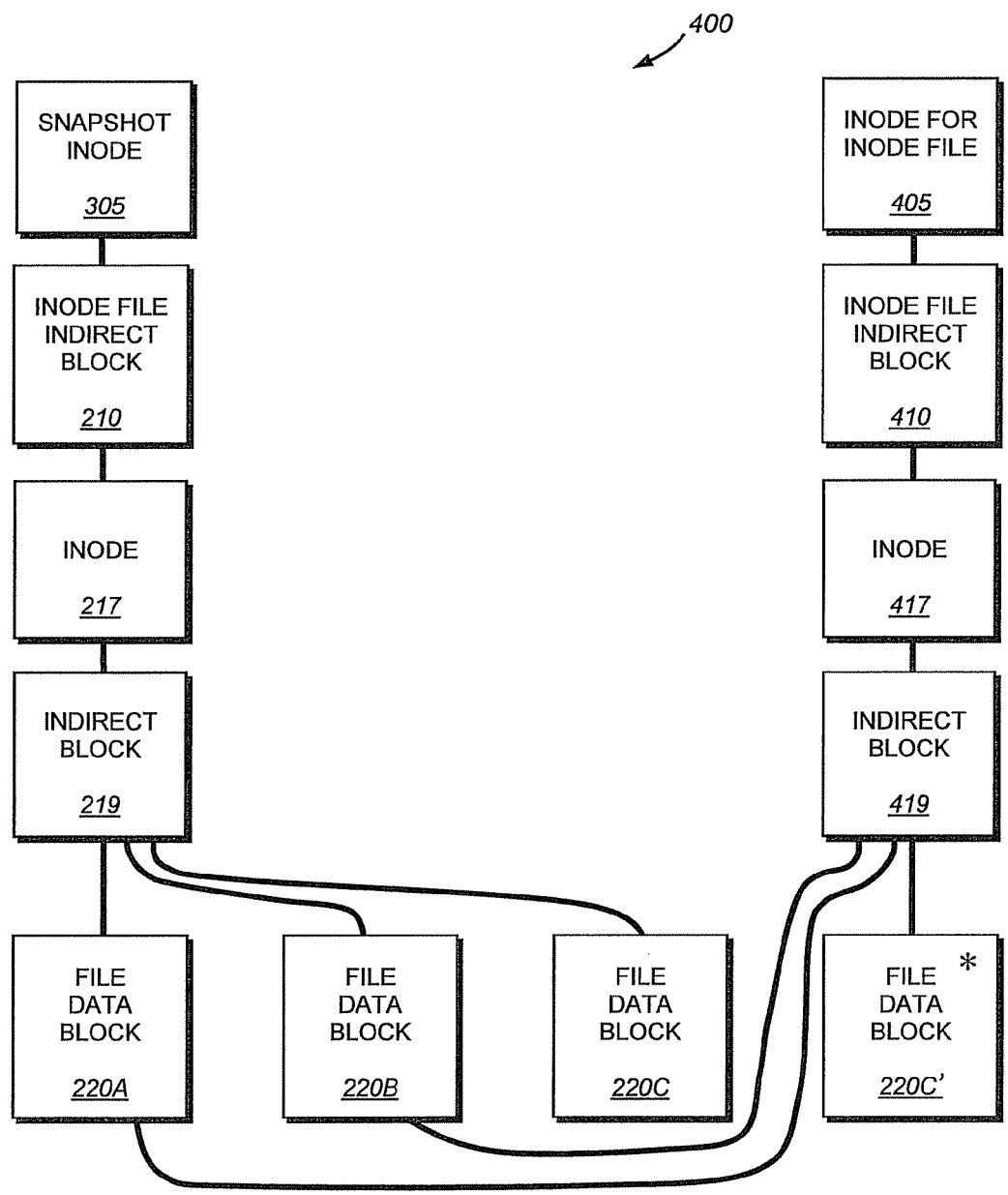
FIG. 4, already described, is an exemplary on-disk representation of a modified file showing a snapshot inode and regular file inode.
Figure 5:
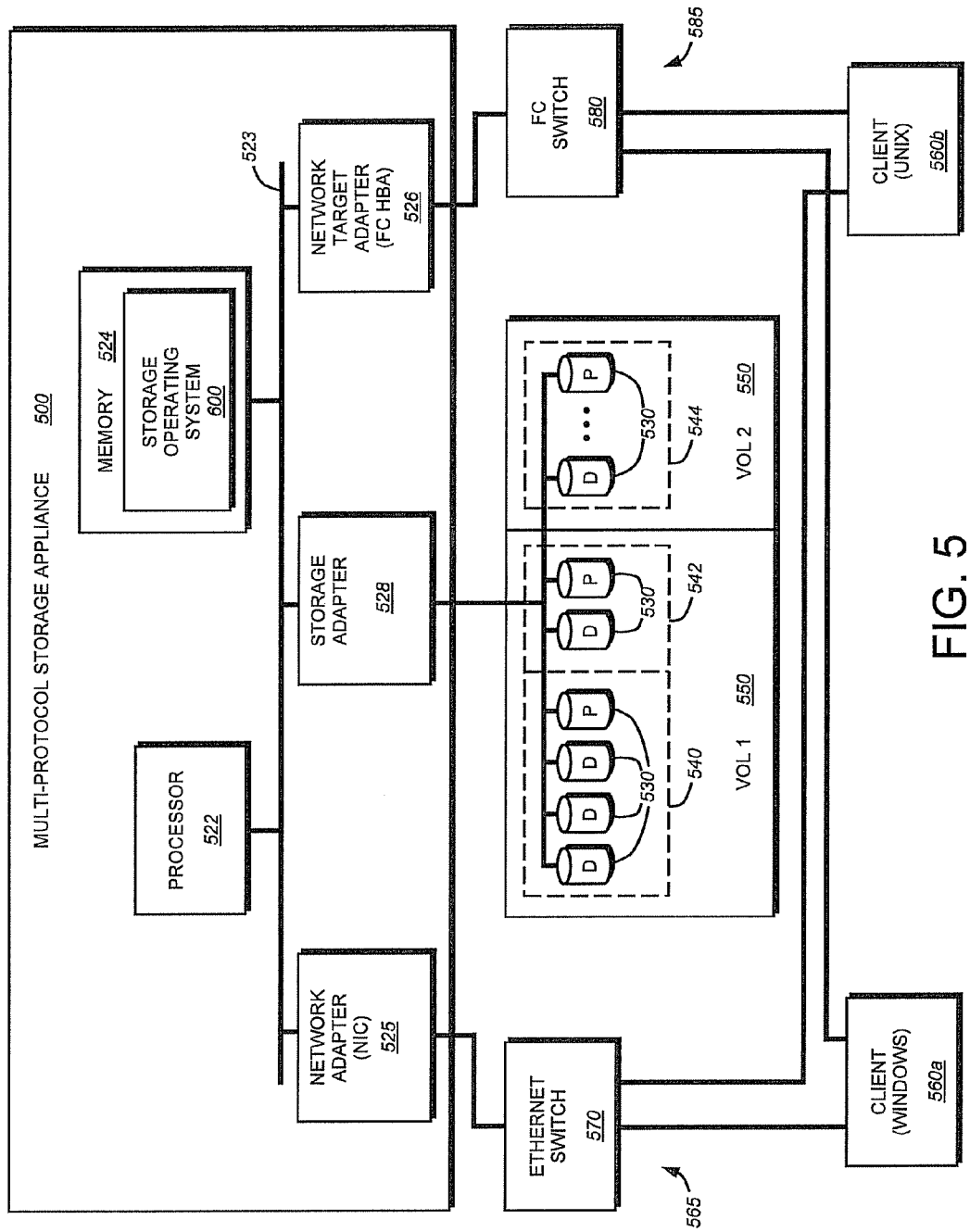
FIG. 5 is a schematic block diagram of a multi-protocol storage appliance in accordance with an embodiment of the present invention.

FIG. 5 is a schematic block diagram of a multi-protocol storage appliance 500 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 500 is illustratively embodied as a storage system comprising a processor 522, a memory 524, a plurality of network adapters 525, 526 and a storage adapter 528 interconnected by a system bus 523. The multi-protocol storage appliance 500 also includes a storage operating system 600 that provides a virtualization system (and, in particular, a file system) to logically organize the information as a hierarchical structure of named directory, file and virtual disk (vdisk) storage objects on the disks 530.

The clients of a SAN-based network environment have a storage viewpoint of blocks or disks. To that end, the multi-protocol storage appliance 500 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 525 couples the storage appliance to a plurality of clients 560a,b over point-to-point links, wide area networks, virtual private networks implemented over a public network (Internet) or a shared local area network, hereinafter referred to as an illustrative Ethernet network 565. For this NAS-based network environment, the clients are configured to access information stored on the multi-protocol appliance as files. Therefore, the network adapter 525 may comprise a network interface card (NIC) having the mechanical, electrical and signaling circuitry needed to connect the appliance to a network switch, such as a conventional Ethernet switch 570. The clients 560 communicate with the storage appliance over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols is when accessing information (in the form of files and directories) over a NAS-based network. Therefore, each client 560 may request the services of the storage appliance 500 by issuing file access protocol messages (in the form of packets) to the appliance over the network 565. For example, a client 560a running the Windows operating system may communicate with the storage appliance 500 using the Common Internet File System (CIFS) protocol over TCP/IP. On the other hand, a client 560b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 526 also couples the multi-protocol storage appliance 500 to clients 560 that may be further configured to access the stored information as blocks or disks. For this SAN-based network environment, the storage appliance is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the appliance 500 to a SAN network switch, such as a conventional FC switch 580. In addition to providing FC access, the FC HBA offloads fiber channel network processing operations for the storage appliance.

The clients 560 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 530, to attach to the storage appliance 500. In SCSI terminology, clients 560 operating in a SAN environment are initiators that initiate requests and commands for data. The multi-protocol storage appliance is thus a target configured to is respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage appliance 500) by issuing iSCSI and FCP messages over the network 585 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 528 cooperates with the storage operating system 500 executing on the storage appliance to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the appliance 500 is preferably implemented as one or more storage volumes (e.g., VOL1-2 550) that comprise a cluster of physical storage disks 530, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

Within each volume may be stored one or more virtual disks (vdisks). A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within a file system of a storage system. As used herein, a set of stream inodes shall be meant as one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section within the file system. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al., which application is incorporated by reference as though fully set forth herein.

B. Storage Operating System

To facilitate access to the disks 530, the storage operating system 600 implements a write-anywhere file system that cooperates with virtualization modules to provide a function that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein. The term "metadata" refers to data that is generated, stores and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data."

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
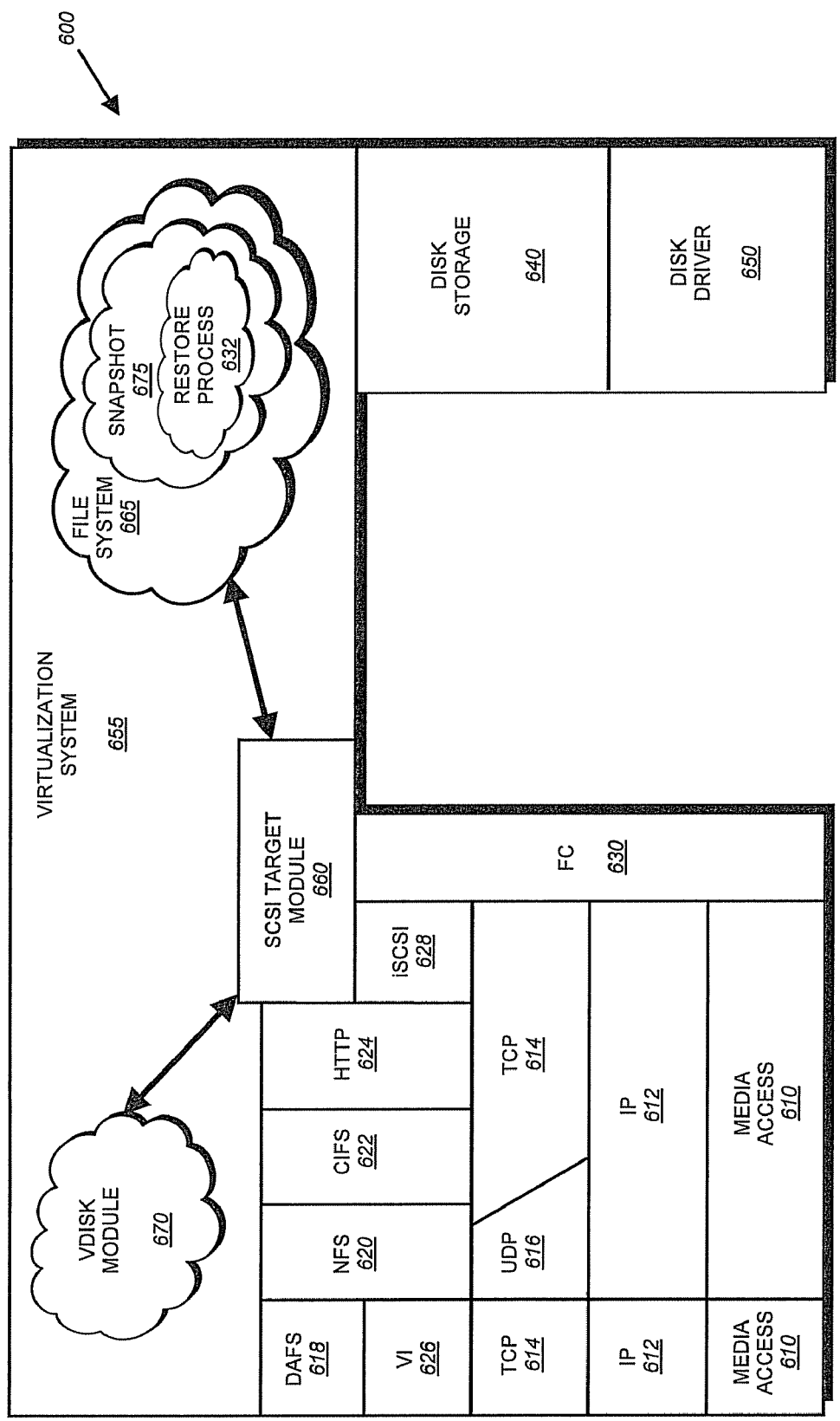
FIG. 6 is a schematic block diagram of an exemplary storage operating system in accordance with an embodiment of the present invention.

FIG. 6 is a schematic block diagram of the storage operating system 600 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A VI layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 interacting with virtualization modules illustratively embodied as, e.g., vdisk module 670 and SCSI target module 660. It should be noted that the vdisk module 670, the file system 665 and SCSI target module 660 can be implemented in software, hardware, firmware, or a combination thereof. The vdisk module 670 interacts with the file system 665 to enable access by administrative interfaces in response to a system administrator issuing commands to the multi-protocol storage appliance 500. In essence, the vdisk module 670 manages SAN deployments by, among other things, implementing a comprehensive set of vdisk (lun) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or lun by providing a mapping procedure that translates luns into the special vdisk file types. The SCSI target module is illustratively disposed between the FC and iSCSI drivers 628, 630 and the file system 665 to thereby provide a translation layer of the virtualization system 655 between the SAN block (lun) space and the file system space, where luns are represented as vdisks. By "disposing" SAN virtualization over the file system 665, the multi-protocol storage appliance reverses the approaches taken by prior systems to is thereby provide a single unified storage platform for essentially all storage access protocols.

The file system 665 is illustratively a message-based system; as such, the SCSI target module 660 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 660 passes the message into the file system 665 as, e.g., a function call, where the operation is performed.

The file system 665 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the above-incorporated U.S. Pat. No. 5,819,292.

SAN clients typically identify and address disks by logical numbers or luns. However, the automated storage virtualization technique allows system administrators to manage vdisks and their addressing by logical names. To that end, the vdisk module 670 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization technique addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

Included within the file system 665 is a set of snapshot processes 675, which implement the inherent snapshot capabilities of the file system including, e.g., the vdisk restoration process, described below. The inherent snapshot capabilities of the WAFL file system are further described in the above-incorporated *TR3002 File System Design for an NFS File Server Appliance* and U.S. Pat. No. 5,819,292. The snapshot processes include a vdisk restore function that implements the novel vdisk restoration system and method.

Figure 7:
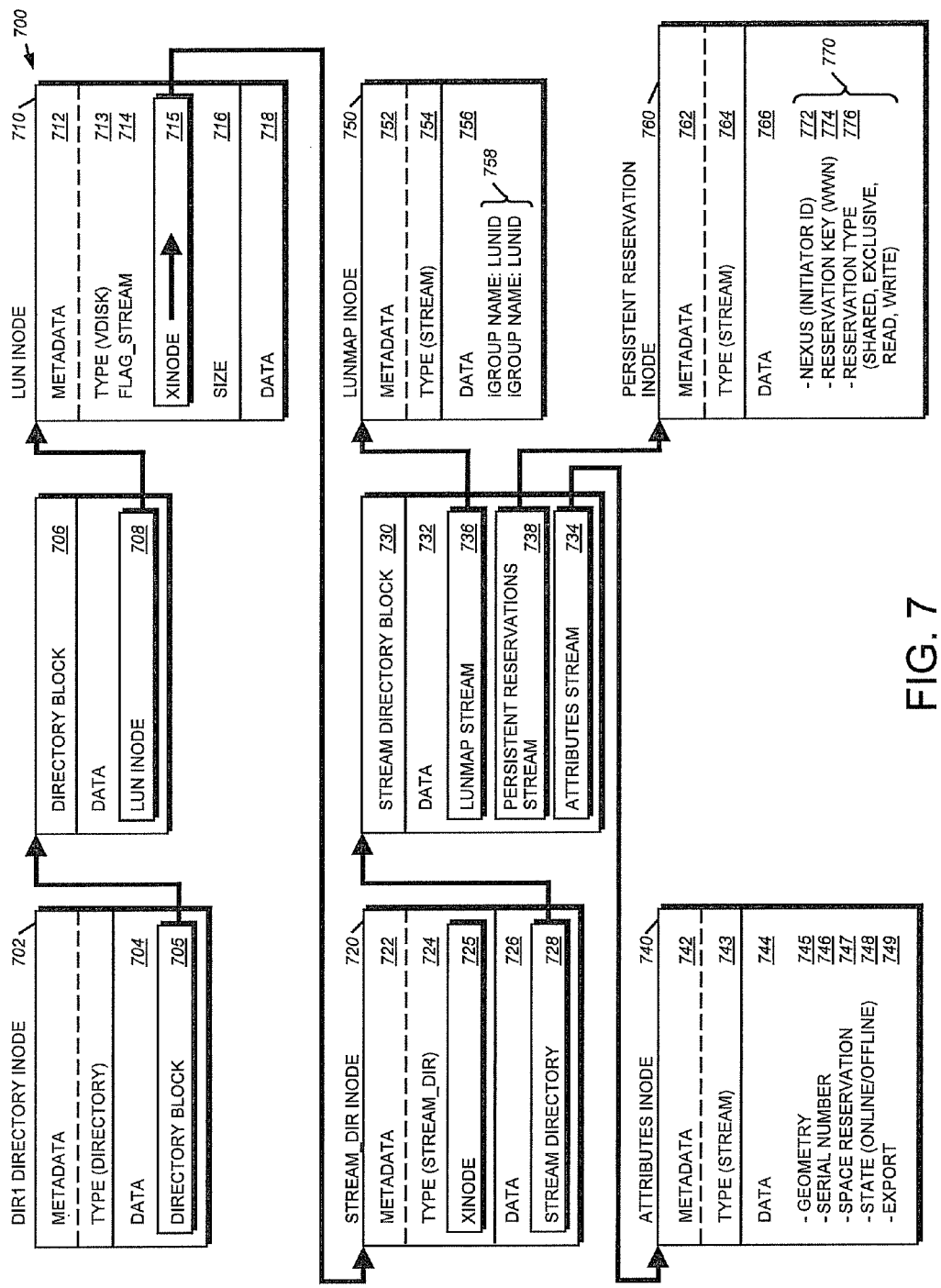
FIG. 7 is an exemplary on-disk representation of a vdisk and associated data stream.

The storage system provides an on-disk representation of a vdisk stored on, for example, a multi-protocol storage appliance. FIG. 7 is a schematic block diagram illustrating an exemplary on-disk representation 700 of inode data structures, including vdisk (lun) and stream inodes. A directory (DIR1) inode 702 includes a data section 704 of pointers 705 that references directory data blocks, one of which is directory block 706. The directory block includes a plurality of entries, each containing an external representation of an inode (i.e., the name of the inode) along with mapping information (i.e., the inode number) for that inode. One of those entries, entry 708, contains mapping information (e.g., a pointer) that references a lun inode 710.

The lun inode 710 is the special file inode that functions as a main container for storing data associated with the vdisk. That is, the lun inode comprises a data section that may store the actual (user or application) data or pointers referencing 4 KB data blocks on disk used to store the data. The data stored in this "default" container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 710 also comprises is a metadata section 712 containing metadata such as the type 713 (i.e., a special vdisk type) and size 716 of the vdisk that, upon creation of the inode, is zero. A flag_stream flag 714 identifies the lun inode 710 as having not only a default data container section 718 but also one or more stream "sections", as provided by stream_dir inode 720.

In order to access the stream_dir inode 720, the pointer of xinode field 715 in lun inode 710 is modified to reference that inode. The stream_dir inode 720 comprises a metadata section 722 that includes a type (stream_dir) field 724 and an xinode field 725 that references another on-disk inode structure containing, e.g., access control (such as CIFS permission) information associated with the vdisk. The inode 720 also includes a data section 726 containing a pointer 728 that references a stream directory data block associated with the vdisk, such as stream directory block 730. The stream directory block 730 comprises a data section 732 that includes a plurality of entries, each containing an external representation of a stream inode along with mapping information (i.e., the inode number) for that inode. One of those entries, entry 734, contains mapping information (e.g., a pointer) that references an attributes (stream) inode 740.

The attributes inode 740 comprises a metadata section 742 that includes a type (stream) field 743 and a data section 744 that functions as a persistent store for holding various named attributes associated with the vdisk. Attributes are an implementation mechanism that is internal to the file system and not managed by users. These attributes include information that allows the vdisk to be exported as a logical unit number (lun) to, e.g., SAN clients. In addition, the attributes include information that allow the encapsulated vdisk to persist, e.g., over reboot operations, and enable management of the vdisk as a single disk object in relation to the SAN clients.

Examples of the attributes include, among others, geometry 745, SCSI serial number 746, space reservation 747, state (on-line/off-line) 748 and export information 749, the latter controlling access to the vdisk by, e.g., specifying a list of initiators to which the vdisk is exported (i.e., those that have permissions to access to the vdisk). The geometry information 745 pertains to the physical geometry of the vdisk needed for emulation of a disk or lun. For example, the vdisk size (as provided by a user) is algorithmically converted to geometry information (e.g., cylinder size), which may be returned to a SAN client as representative of the disk or lun. Although the geometry 745 is illustratively shown as persistently stored in the attributes inode 740, in an alternate embodiment, the geometry information 745 may be calculated dynamically (on-the-fly).

Other entries 736, 738 of the stream directory block 730 contain mapping information (e.g., pointers) that references other stream inodes, such as a lunmap (stream) inode 750 and a persistent reservations (stream) inode 760. The lunmap inode 750 comprises a metadata section 752 that includes a type (stream) field 754 and a data section 756 that functions as a persistent store for holding a list 758 of name-value pairs. In the illustrative embodiment, the name is an initiator group (igroup) name and the value is a lun identifier (ID). An igroup is a logical named entity that is assigned to one or more addresses associated with one or more initiators (depending upon whether a clustered environment is configured). These addresses may comprise WWN addresses or iSCSI IDs. A "lun map" command is used to export one or more vdisks to the igroup, i.e., make the vdisk(s) "visible" to the igroup. In this sense, the "lun map" command is equivalent to an NFS export or a CIFS share. The WWN addresses or iSCSI IDs thus identify the clients that are allowed to access those vdisks specified by the lun map command.

The persistent reservations inode 760 comprises a metadata section 762 that includes a type (stream) field 764 and a data section 766 that functions as a persistent store for holding a list 770 of persistent reservation records that provide ownership and access information relating to the vdisk. Persistent reservations are described in SCSI-3 Primary Commands-3, by Committee T10 of the National Committee for Information Technology Standards. Each persistent reservation record comprises a nexus (initiator ID) 772, a reservation key (WWN) 774 and a reservation type (shared, exclusive, read, write) 776.

In sum, the vdisk storage object is structured to contain data and metadata needed to control and manage that object in a single storage entity that is easy to manage within the framework of a storage operating system executing on a multi-protocol storage appliance. To that end, the vdisk (data and attributes) is managed as a single encapsulated unit within the file system.

Specifically, the binding between the data (file inode) and stream inodes of a vdisk creates a single encapsulated object that is "self-describing" in that it contains all the information necessary to, e.g., access that object. Thus, no "external" information is needed to describe the vdisk object. It should be noted that there is no binding between a vdisk and disk blocks during write operations (or read operations when defragmentation takes place transparently "on-the-fly"). The disk blocks are mapped to logical block addresses of an object residing in the file system. In this case, the file system functions as a dynamic volume manager. This decoupling is a result of using the file system as an underlying storage manager.

C. Vdisk Restoration from a Snapshot

Figure 8:
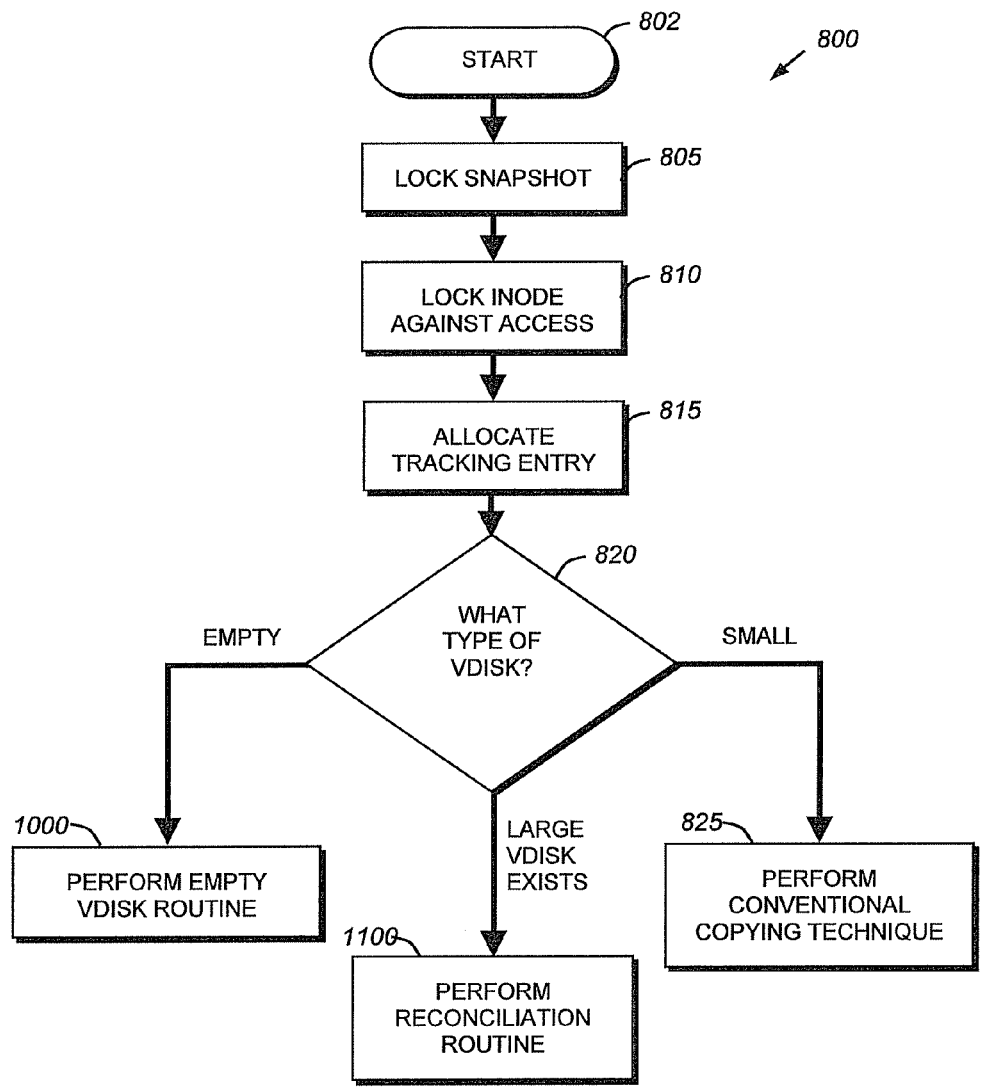
FIG. 8 is a flowchart detailing a procedure for performing a restoration of a vdisk from a snapshot in accordance with an embodiment of the present invention.

The procedure 800 performed by the file system of the storage operating system, or its associated snapshot processes, in restoring a vdisk from a snapshot is shown in FIG. 8. Typically, such a vdisk restore process would be initiated by the use of a command entered by the user or administrator of the file server. This command could be entered either through a command line interface (CLI) or via a menu or other selection in a graphical user interface (GUI). As options to the command, the user enters the name and path to the vdisk to be restored and, in alternate embodiments, a name and path for the vdisk to be restored to, if it is different from the vdisk's original name and/or location. Thus, for example, a vdisk that was snapshotted when it existed in /dir/sub/vdisk, could be restored to /foo/bar/othervdisk.

The procedure begins in step 802 and then proceeds to step 805, where the vdisk restore process first locks the associated snapshot. This locking can be accomplished using known file system file locking mechanisms. The locking of the snapshot ensures that the snapshot will not be modified or deleted while the vdisk is being restored. Next, in step 810, the inode associated with the vdisk to be restored is locked against access. Such locking can be accomplished by, for example, setting a flag within the lun inode that is manipulated by an appropriate operating system lock manager. The file system layer and its associated processes recognize the flag and thereby restrict access to the inode. In certain embodiments, select file system processes or functions may have access to the lun inode. For example, a process or function for determining attributes of the vdisk associated with the lun inode may be permitted to access the inode to determine file system parameters. Similarly, in certain alternative embodiments, a command or process to delete the vdisk may be permitted to execute even though the lun inode is locked against access.

The vdisk restore process then creates a tracking entry (step 815). This tracking entry, described further below, is utilized to determine which inodes and block pointers have been compared during the remaining portion of the restore process. Next, in step 820, the restore process determines what type of vdisk is being restored. By "type of vdisk" it is meant, in the illustrative embodiment, whether the vdisk exists in the active file system, is absent from the active file system, or is a small vdisk.

If the vdisk to be restored is a small vdisk, using an administrator defined definition of "small," the process performs the conventional copying restore technique by duplicating the inodes' block pointers, data blocks and streams from the snapshot to the active file system (step 825). If the vdisk is absent from the active file system (i.e. the vdisk has been deleted from the active file system), the restore process performs the empty file routine (routine 1000). Otherwise, the vdisk exists in the active file system and is not a small vdisk. In such a case, the restore process proceeds to step 1100 and performs the standard vdisk restore routine.

FIG. 9 is a schematic block diagram of an exemplary tracking entry 900 in accordance with an embodiment of the invention. The tracking entry 900 includes fields for a vdisk ID 905, a generation number 910, a twin ID and generation 915 and 920, a snapshot ID and generation 925 and 930, a snap ID 935 and a last field block number (FBN) field 940. The vdisk ID field 905 contains the vdisk ID of the vdisk of the active file system. The generation field 910, includes the generation count of the vdisk of the active file system. Similarly, the twin ID and generation fields 915 and 920 contain the vdisk ID and generation count of the twin inode created during a restoration process. The snapshot ID 925 and snapshot generation 930 also correspond to the ID of the vdisk in the is snapshot and the generation count of the vdisk in the snapshot. The snap ID field 935 contains the snap ID of the snapshot being restored therefrom. Finally, the last FBN field 940 is utilized as a storage space to hold the last file block number that was reconciled during the buffer tree reconciliation process, described further below. Thus, the reconciliation process utilizes the tracking entry to determine its progress in reconciliating the FBNs associated with a snapshot.

Figure 10:
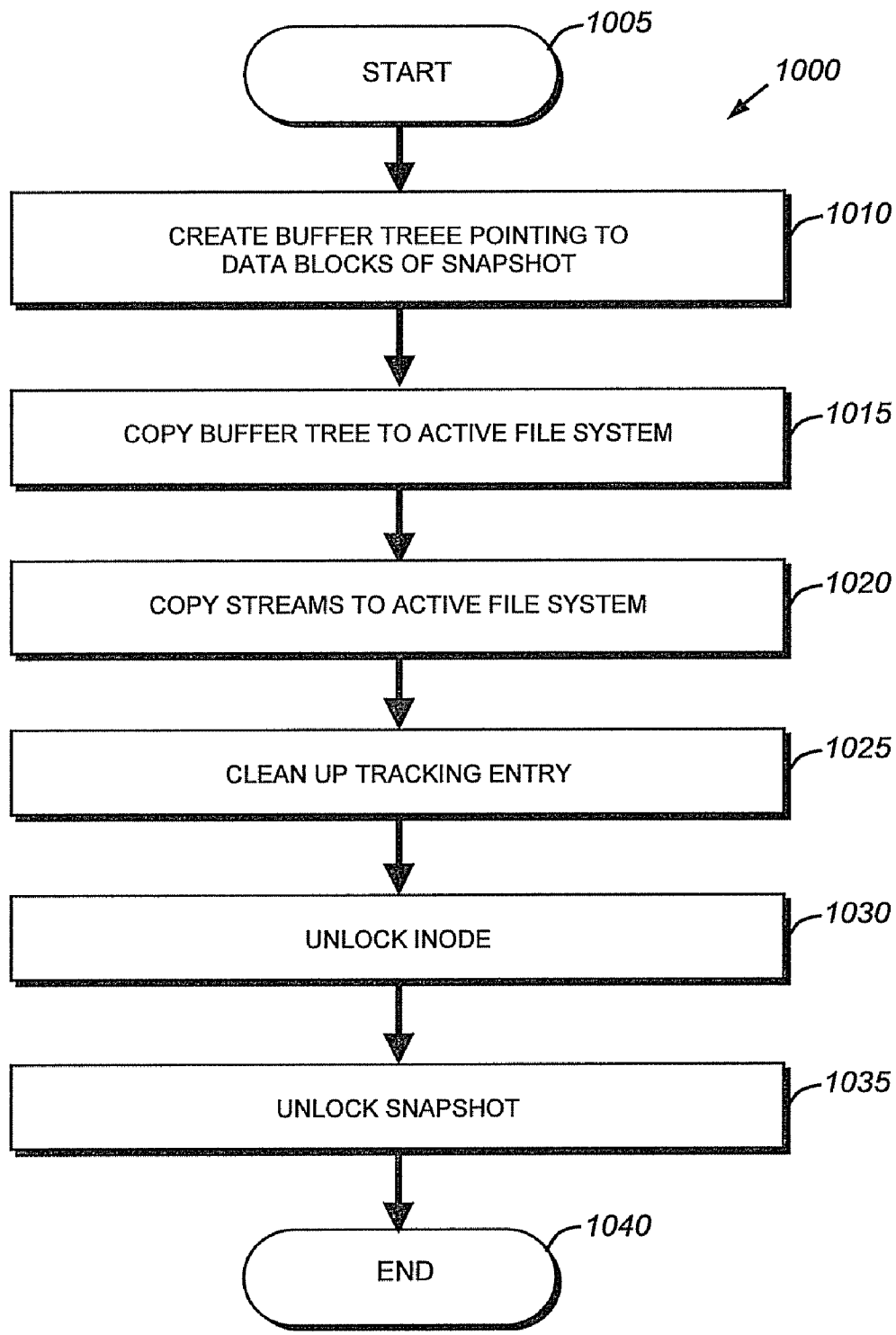
FIG. 10 is a flowchart detailing the steps of a procedure for restoring a vdisk to the active file system if the vdisk was previously deleted from the active file system.

FIG. 10 is a flowchart illustrating the restore routine 1000 performed by the restore process 632 when the vdisk is not in the active file system. The procedure begins in step 1005 and proceeds to step 1010 where the restore process creates a buffer tree pointing to the data blocks of the snapshot. This buffer tree is then copied to the active file system (step 1015). By utilizing the data blocks stored in the snapshot, the number of additional inode blocks in the buffer tree is minimized as these data blocks do not need to be duplicated. Thus, minimal additional file system space is required. Next, in step 1020, the streams associated with the vdisk are then copied from a snapshot to the active file system. As the amount of data stored in the streams for any given vdisk is relatively small, for example on the order of kilobytes, the storage appliance does not suffer a performance degradation due to the copying of this data. The tracking entry is then removed in step 1025. This removal process entails, for example, the deallocation of memory or other data structures associated with the tracking entry. The newly created lun inode is then unlocked in step 1030. Finally, in step 1035, the snapshot is unlocked. At this point, the newly created inode resides in the active file system and contains the proper pointers and buffer tree corresponding to the data blocks of the snapshot. By pointing to the data blocks stored in the snapshot, the number of inode blocks that must be written is decreased by a factor equal to the number of data blocks that each inode can point to. In the illustrative embodiment, each inode can point to 1,024 data blocks. Thus, by utilizing this restoration process, fewer than $1/1024$ of the data block must be accessed compared to conventional snapshot restore methodologies.

Figure 11:
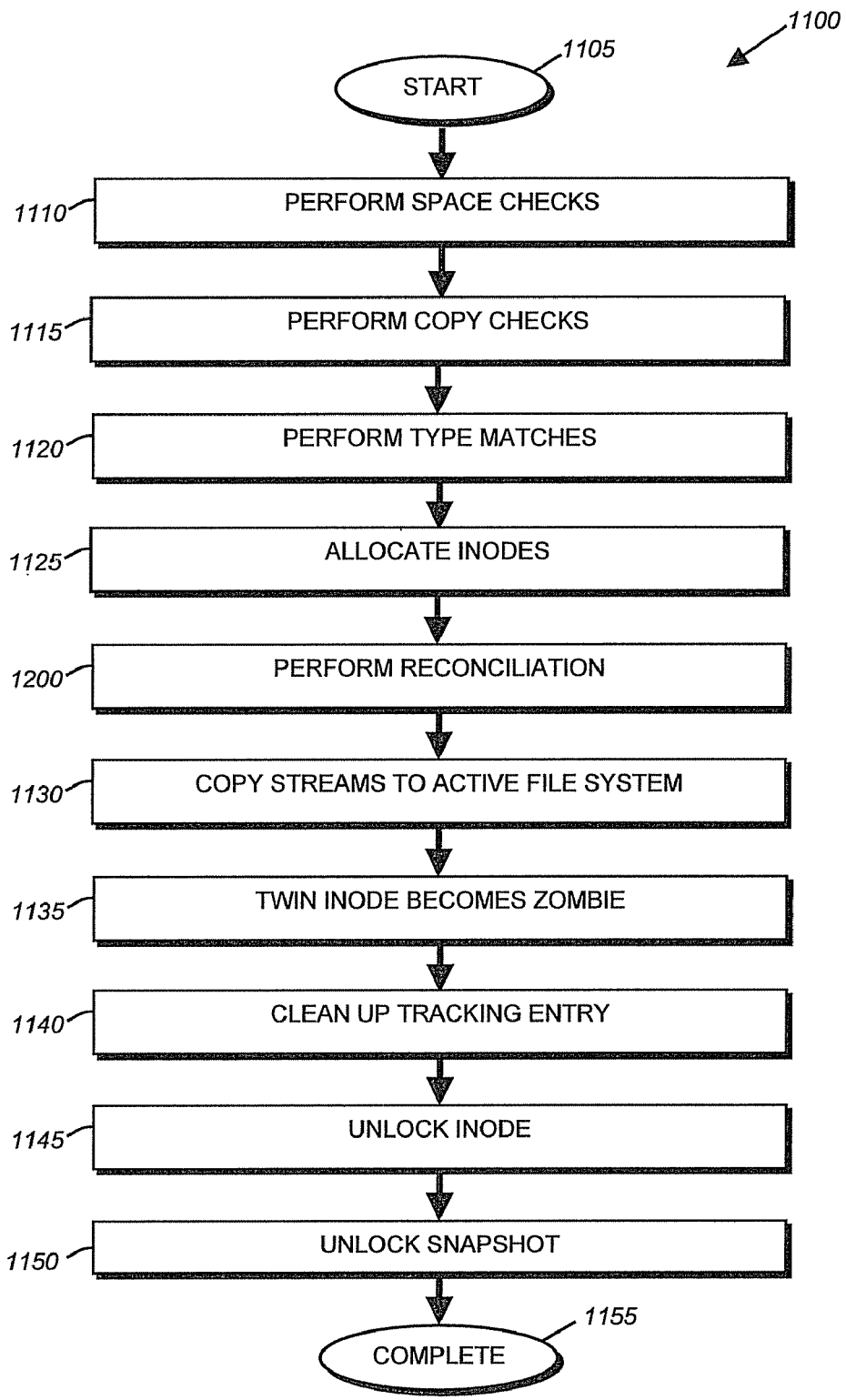
FIG. 11 is a flowchart detailing the steps of a procedure for restoring a vdisk from a snapshot to an active file system.

The process 1100 performed by the restore process for a vdisk that needs to undergo the above-referenced reconciliation process is shown in FIG. 11. The procedure begins in step 1105 and then proceeds to step 1110 where the process performs a series of space checks. The space checks are to ensure that the newly created and restored vdisk will fit within the active file system. While the process of the present invention typically requires little additional space in the active file system for restored vdisks, there are several cases where substantial additional space is required. For example, if a vdisk was 100 megabytes (MB) in size when the snapshot occurred, but since then has been modified so that it is only 1 MB in size, a restoration of the vdisks results in some increased space within the active file system. This increase in space is still significantly smaller than used by conventional restore techniques. Next, the process performs a series of copy checks (step 1115). In step 1120, the restore process performs a type match. This type match ensures that, for example, no attempt is made to restore the vdisk in the snapshot to a directory, or vice versa.

Next, in step 1125, an inode and associated buffer trees are allocated for use during the restoration process. The inode that is allocated is a new inode for the restored vdisk in the active file system. Additionally, the buffer trees of the existing vdisk are copied to a twin. This twin, thus, has a twin inode and associated buffer trees. The restore process then proceeds to do the reconciliation process in step 1200. This reconciliation process, described below, walks through the buffer trees of the twin and the snapshot and generates the restored file. Next, in step 1130, the streams associated with the vdisk are then copied to the active file system. As noted above, the streams associated with a given vdisk are relatively small, and therefore do not generate a noted performance degradation of the storage appliance. In step 1135, the twin inode is turned into a "zombie" inode. Zombie inodes are later processed by the file system for reallocation. Such zombie processing is described in U.S. Pat. No. 6,751,635 entitled MANIPULATION OF ZOMBIE FILES AND EVIL-TWIN FILES by Raymond C. Chen et al., issued on Jun. 15, 2004, which is incorporated herein by reference. It should be noted that the use of is zombie files is for illustrative purposes only. In alternate embodiments, the twin inode could simply be deleted or otherwise unallocated from the active file system. The tracking entry is then deleted by, for example, freeing memory or data structures associated with the tracking entry (step 1140). The newly created inode of the file system is then unlocked (step 1145). At this point the newly restored file is accessible by the active file system. Then, in step 1150, the snapshot is unlocked. At this point the process is complete (step 115).

Figure 12:
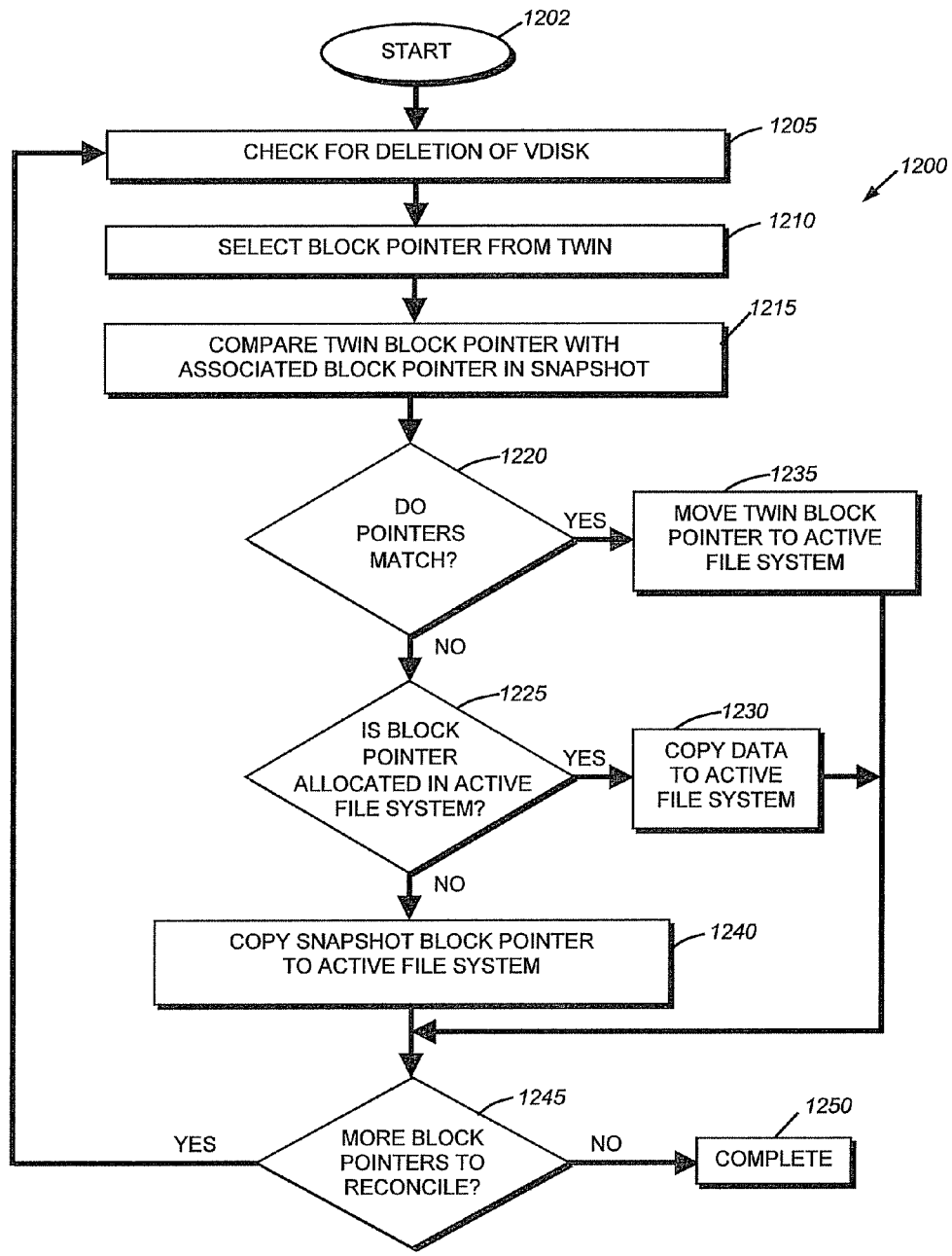
FIG. 12 is a flowchart detailing the steps of a procedure for performing a buffer tree reconciliation process in accordance with an embodiment of the invention.

The reconciliation process 1200 utilized by the restore process 1100 is shown in FIG. 12. The process begins at step 1202 and then checks for vdisk deletion (step 1205). This check is to ensure that if a user deletes the vdisk being restored, the vdisk will be deleted and the restoration process will not proceed. The restore process then selects a block pointer from the twin (step 1210). The twin block pointer is then compared with the associated block pointer stored in the snapshot in step 1215. A determination is made, in step 1220 if the block pointers match. By match it is meant that the two block pointers point to the same data blocks. If the two block pointers do match, the block pointer from the twin is moved to the active file system in step 1235. If the block pointers do not match, a determination is made if the block that is pointed to by the block pointer is already allocated in the active file system (step 1225). If the block is already allocated, then the data from the block is copied to a new block in the active file system. Otherwise, the block pointer from the snapshot is copied to the active file system. Thus, if a particular block pointer has not been modified from the time of the snapshot to the time of file restoration, the block pointer from the associated twin, which is a copy of the block pointer stored in the active file system, is moved to the active file system. If the associated block pointer has been modified, a copy of the block pointer is generated from that stored in the snapshot and copied to the active file system if the block is not allocated in the active file system. Next, in step 1245, the restore process determines if there are more block pointers that need to be reconciled. If there are no more block pointers to reconcile, the reconciliation process 1200 is complete (step 1250) and the restore process continues on in accordance with the procedure outlined in FIG. 11. If there are more is block pointers to be reconciled, the process loops back to step 1205 and performs an additional deletion check. Throughout the reconciliation process 1200, the tracking entry is used to determine which blocks have been compared and which blocks need to be compared. In accordance with an alternate embodiment, multiple blocks can be compared at a time. For example, sixteen blocks can be read from the twin and compared with their associated snapshot blocks at a time. The use of multi-block comparison improves the performance of the reconciliation process.

To again summarize, upon execution of the vdisk restore process, which may be included in the file system or snapshot processes of a storage operating system, the snapshot and inodes are locked against access and tracking entry is created. The vdisk restore process then determines what type of vdisk is being restored. If the file meets a predetermined or user-defined definition of a "small" vdisk, then a conventional snapshot duplication technique can be utilized to restore the vdisk. If the vdisk has been deleted from the active file system, then the restore process generates a buffer tree, which points to the data blocks stored in the snapshot. Once this buffer tree is created, it is written to the active file system. The streams associated with the vdisk in the snapshot are then copied to the active file system, thereby restoring the vdisk.

If the vdisk exists in the active file system, the reconciliation process occurs. After performing a series of verification operations, the restore process allocates a new inode from the restored vdisk and creates a twin inode which contains the inodes associated with the vdisk currently in the active file system. A reconciliation process is then performed whereby a block from a twin inode is then paired to a block in the snapshot. If the blocks are equal, the block from the twin is moved to the active file system. If the blocks are not equal, then the block from the snapshot is copied to the active file system. This reconciliation procedure proceeds until all blocks and the twin snapshot have been compared. At the end of the reconciliation procedure, the twin only contains links and pointers to blocks which have been modified since the time of the snapshot. This twin inode is then turned into a zombie for later processing and deletion. This process thus significantly reduces the number of data blocks that need to be copied from the snapshot is to the active file system. By reducing the number of data copies file system space is saved and processing overhead is reduced. After the reconciliation process, the streams associated with the vdisk are then copied from the snapshot to the active file system. At this point, the vdisk has been restored to the active file system and may be unlocked for use.

More generally, the teachings of the present invention may apply to any logical data containers (LDC) implemented in an environment comprising an active store and one or more reference stores. In such embodiments, the active store permits data to be read from and written to it, while the reference stores are read only point in time images of the active store.

The foregoing has been a detailed description of the illustrative embodiment of the invention. Various modifications and additions can be made without departing from the spirit and scope of the invention. For example, it is understood that the various data structures and inodes can include additional fields and/or be generated or managed by differing layers of a storage operating system while remaining within the scope of the present invention. Additionally, while this description has been written and referenced to storage appliances, the principles are equally pertinent to all types of computers, including stand alone computers. It should be noted that as used herein, a set of stream inodes may comprise one or more stream inodes. It is expressly contemplated that encapsulated data containers, other than vdisk, may be utilized in accordance with the teachings of the present invention. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for restoring a virtual disk (vdisk) in a data storage system as the vdisk was at an earlier time, comprising:
   maintaining pointers pointing to data represented by the vdisk, the data stored on a data storage device of the data storage system;
   saving the pointers to persistent storage at the earlier time;
   maintaining the data at the earlier time on the data storage device;
   comparing a pointer pointing to the data represented by the vdisk at a later time with the pointers saved at the earlier time;
   if the pointer from the later time matches the pointer saved at the earlier time, keeping the pointer from the later time in an active file system of the data storage system; and
   if the pointer from the later time does not match the pointers saved at the earlier time, copying a set of pointers associated with the pointer saved at the earlier time to the active file system.

2. The method as in claim 1, further comprising:
   arranging the pointers in an inode structure, the inode structure having a base inode and one or more stream inodes.

3. The method as in claim 1, further comprising:
   in the event that the vdisk has been deleted from the active file system, then creating a new vdisk inode for a restored vdisk as a new base inode; and
   copying one or more stream inodes from the pointers saved at the earlier time into a buffer tree of the new vdisk inode of the restored vdisk.

4. The method as in claim 3, further comprising:
   in the event that the vdisk exists in the active file system, copying an inode structure at the later time as a twin inode, the twin inode having a buffer tree of the inode structure at the later time;
   generating a new base inode for the restored vdisk;
   accomplishing the comparing step by comparing a pointer saved at the earlier time with a pointer of the twin inode;
   if the pointers match, moving the pointer from the twin inode to the new base inode for the restored vdisk; and
   if the pointers do not match, copying the set of pointers associated with the pointers saved at the earlier time to the new base inode for the restored vdisk.

5. The method as in claim 4, further comprising:
   after the comparison step is completed, using inodes remaining in the twin inode as pointers to data written after the earlier time at which the pointers were saved.

6. The method as in claim 1, further comprising
   using a memory as the data storage device.

7. The method as in claim 1, further comprising
   using a tape as the data storage device.

8. The method as in claim 1, further comprising
   using a disk as the data storage device.

9. The method as in claim 1, further comprising
   using a RAID array of disks as the data storage device.

10. An apparatus to restore a virtual disk (vdisk) in a data storage system as the vdisk was at an earlier time, comprising:
    an operating system to maintain pointers pointing to data represented by the vdisk;
    one or more data storage devices to save the pointers to persistent storage at the earlier time;
    the data stored at the earlier time maintained on the data storage device;
    a processor to compare a pointer at a later time with the pointers saved at the earlier time;
    if the pointer from the later time matches the pointer saved at the earlier time, the processor to keep the pointer from the later time in an active file system of the data storage system; and
    if the pointer from the later time does not match the pointer saved at the earlier time, the processor to copy a set of pointers associated with the pointer saved at the earlier time to the active file system.

11. The apparatus as in claim 10, further comprising:
    the operating system to arrange the pointers in an inode structure, the inode structure having a base inode and one or more stream inodes.

12. The apparatus as in claim 10, further comprising:
    in the event that the vdisk has been deleted from the active file system, the processor to create a new vdisk inode as a new base inode; and
    the operating system to copy one or more stream inodes from the pointers saved at the earlier time into a buffer tree of the new vdisk inode of the restored vdisk.

13. The apparatus as in claim 12, further comprising:
    in the event that the vdisk exists in the active file system, the processor to copy an inode structure at the later time as a twin inode, the twin inode having the buffer tree of the inode structure at the later time;
    the operating system to generate a new base inode for the restored vdisk;
    the processor to accomplish the comparing step by comparing a pointer saved at the earlier time with a pointer of the twin inode;
    if the pointers match, the operating system to move the pointer from the twin inode to the new base inode for the restored vdisk; and
    if the pointers do not match, the operating system to move the set of pointers associated with the pointers saved at the earlier time to the new base inode for the restored vdisk.

14. The apparatus as in claim 13, further comprising:
    after the comparison step is completed, the processor to use the inodes remaining in the twin inode as pointers to data which was written after the earlier time at which the pointers were saved.

15. The apparatus as in claim 10, further comprising
    a memory used as the data storage device.

16. The apparatus as in claim 10, further comprising
    tape used as the data storage device.

17. The apparatus as in claim 10, further comprising a disk used as the data storage device.

18. The apparatus in claim 10, further comprising a RAID array of disks used as the data storage device.

19. A computer readable physical storage media, comprising:
said computer readable storage media containing program instructions for execution on a processor for a method of for restoring a virtual disk (vdisk) in a data storage system as the vdisk was at an earlier time, the program instructions for,
maintaining pointers pointing to data represented by the vdisk, the data stored on a data storage device of the data storage system;
saving the pointers to persistent storage at the earlier time;
maintaining the data at the earlier time on the data storage device;
comparing a pointer pointing to the data represented by the vdisk at a later time with the pointers saved at the earlier time;
if the pointer from the later time matches the pointer saved at the earlier time, keeping the pointer from the later time in an active file system of the data storage system; and
if the pointer from the later time does not match the pointers saved at the earlier time, copying a set of pointers associated with the pointer saved at the earlier time to the active file system.

* * * * *

UNITED STATES PATENT AND TRADEMARK OFFICE
CERTIFICATE OF CORRECTION

| | |
|---|---|
| PATENT NO. | : 7,958,168 B2 |
| APPLICATION NO. | : 12/759992 |
| DATED | : June 7, 2011 |
| INVENTOR(S) | : Raymond C. Chen et al. |

It is certified that error appears in the above-identified patent and that said Letters Patent is hereby corrected as shown below:

In Col. 9, line 43 should read:
 configured to ~~is~~ respond to the requests issued by the initiators In Col. 12, line 47 should read:
 reverses the approaches taken by prior systems to ~~is~~ thereby In Col. 16, line 27 should read:
 930 also correspond to the ID of the vdisk in the ~~is~~ snapshot In Col. 17, line 39 should read:
 use of ~~is~~ zombie files is for illustrative purposes only. In In Col. 18, line 13 should read:
 cedure outlined in FIG. 11. If there are more ~~is~~ block pointers Signed and Sealed this
First Day of May, 2012

David J. Kappos
*Director of the United States Patent and Trademark Office*